E. D. CHANINEL & J. R. HENRY.
PROCESS FOR APPLYING CALKS TO HORSESHOES.
APPLICATION FILED MAR. 11, 1910.
1,008,785.
Patented Nov. 14, 1911.
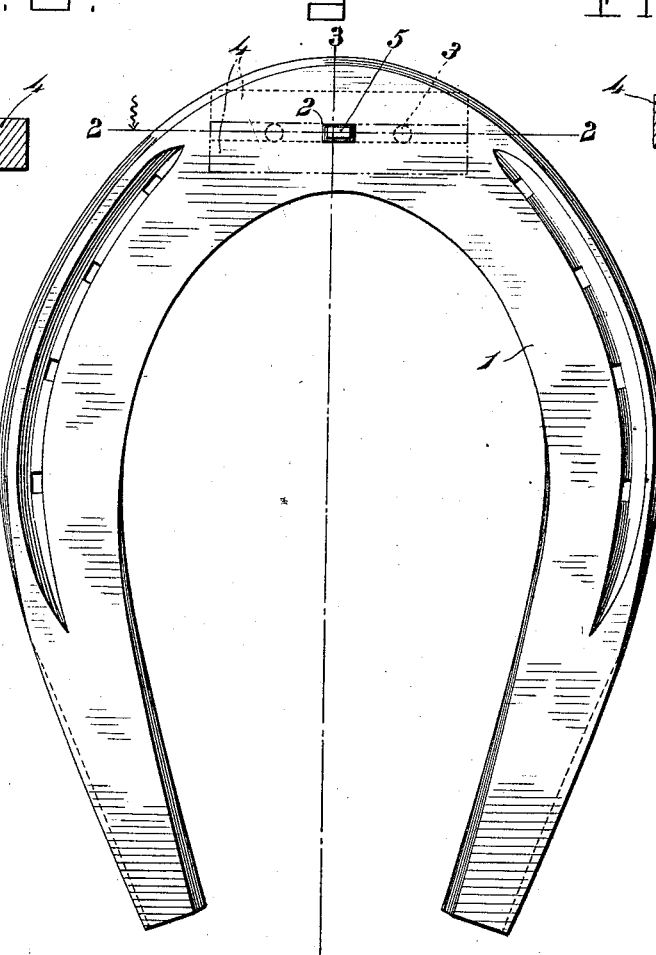

UNITED STATES PATENT OFFICE.

EDWARD D. CHANINEL AND JOHN R. HENRY, OF SEWARD, PENNSYLVANIA.

PROCESS FOR APPLYING CALKS TO HORSESHOES.

1,008,785.  Specification of Letters Patent.  Patented Nov. 14, 1911.

Application filed March 11, 1910. Serial No. 548,529.

*To all whom it may concern:*

Be it known that we, EDWARD D. CHANINEL and JOHN R. HENRY, citizens of the United States, residing at Seward, in the county of Westmoreland and State of Pennsylvania, have invented new and useful Improvements in Processes for Applying Calks to Horseshoes, of which the following is a specification.

The invention relates to an improved process for completing horse shoes in the application of a toe calk, being more particularly directed to a process by which the toe calk is secured in proper alinement and by a perfect weld to the shoe through a single heating.

In the usual manner of applying toe calks to a horse shoe by welding, considerable difficulty is experienced in applying the calk to the shoe in proper position and alinement and in securing such intimate contact between the surfaces of the calk and shoe as to permit a proper welding. In the ordinary process of completing the shoe by applying the calk, the shoe and calk are heated as separate pieces and the welding process carried out when the pieces are removed from the fire. As the calk includes a great deal less material than the shoe it will cool more rapidly than the shoe when removed from the fire with the disadvantageous result of having the two parts at relatively different degrees of heat with the effect to prevent a perfect weld. Furthermore, the separate heating of the shoe and calk expose the contacting surfaces of the respective parts to the formation or accumulation of scale, from any of the well known causes, which scale will defeat a proper welding of the parts. If the scale is mechanically removed, the loss of time incident thereto will ordinarily permit such a cooling of the parts as to interfere with their proper welding.

The main object of the present process is to eliminate all of the above noted objections by initially securing the calk and shoe mechanically together while the parts are cold, the securing means being utilized for properly alining or positioning the calk on the shoe. By such mechanical securing the engaging surfaces of the calk and shoe are brought into such intimate contact as to prevent the formation or accumulation of scale therebetween and, at the same time, permit the calk and shoe in a single heating to be brought to a proper temperature which, while in the fire, causes a sufficient adhesion between the calk and the shoe as to initially secure these parts so that the usual welding operation will form a perfect integral joint. Furthermore, the mechanical connecting means between the calk and shoe, in addition to the functions noted, have another and important advantage in that they provide projections integral with the calk which, in the welding operation, become in effect an integral part of the body of the shoe, thereby, in a measure, relieving the weld joint between the calk and shoe of the greater portion of the strain incident to the use of the shoe.

In carrying out the present process, reference will be had particularly to the accompanying drawings, as illustrative of one embodiment of the mechanical details of such process, in which drawings:—

Figure 1 is a top plan of a horse shoe with the parts constructed for the carrying out of the process. Fig. 2 is a sectional view on the line 2—2 of Fig. 1. Fig. 3 is a sectional view on the line 3—3 of Fig. 1 with the toe calk set back. Fig. 4 is a similar view with the calk set forward.

In carrying out the process, the horseshoe 1, during its initial construction, is formed in the toe portion with a centrally disposed aperture 2, preferably of angular formation and with oppositely disposed recesses 3 alined with the aperture and with each other transverse the shoe. The aperture 2 extends entirely through the body of the shoe while the recesses 3 preferably, though not necessarily, extend but partly through such body. The walls of the aperture 2 incline with relation to each other inwardly and upwardly so that the bottom or entrance to the aperture 2 is larger than the top.

The calk 4 comprises a body or calk section which may be of any of the usual or preferred shapes in plan, longitudinal, or transverse section, that is constructed in any desired manner to provide an engaging surface adapted for any particular use. The calk section is provided in alinement with one edge with a wedge shaped projection 5 having a length exceeding the thickness of the shoe at the aperture 2. Beyond the projection 5, the calk is provided with dowels 6, designed when the projection is seated within the aperture 2 to engage in the recesses 3 and thereby properly center and aline the calk on the shoe. The projection 5 is, adjacent the calk section, of such size with relation to the lower end of the aperture 2 that when said projection is driven into and through the aperture a frictional engagement will be had between the projection and the walls of the aperture with the effect to hold the calk in proper position after initial application to prevent accidental separation of the parts in the reversal of the shoe to complete the mechanical connection. The upper portion of the projection 5 is preferably, though not necessarily, of slightly less sectional dimensions than the correspondingly alined sectional dimensions of the aperture, whereby to insure a proper fitting of the parts in the event the projection should become slightly distorted or bent prior to its application.

In carrying out the essential steps of the process, the parts constructed as described are first mechanically connected in the following manner. The calk is applied to the shoe so that the projection 5 is seated in the aperture 2 and the dowels 6 in the recesses 3. The shoe is then reversed and the projected portion of the part 5 upset to securely fix the calk to the shoe and provide an intimate contact between the surfaces of the calk and shoe. The article in this form is then placed in the fire and brought to a proper welding heat, and, after removal, welded in the usual manner.

By the improved process the intimate contact between the calk and shoe prevents the formation or accumulation of scale on the contacting surfaces, whereby one of the serious objections to the usual welding of these parts is removed. Furthermore, both parts are heated with their contacted surfaces in engagement, securing by the heating an initial adhesion. The use of the projection and dowels will center and aline the calk in exactly proper position, relieving the blacksmith of the necessity of giving this part of the process any attention or consideration whatever. The projection 5 and dowels 6 will, by the welding, become such an intimate part of the shoe body as to materially strengthen the connection and in a very considerable degree relieve the welding joint between the flat surfaces of the calk and shoe of the breaking strain at this point.

As shown in Fig. 3, if the calk is applied with the projection 5 extending from the forward edge thereof the main body or calk section will be set back with relation to the forward edge of the shoe, while with the parts reversed the calk will be set forward, as shown in Fig. 4.

It is of course to be understood that the term horse shoe herein is meant any shoe designed to be applied to an animal for protective purposes, and that while the illustrated construction of the projection and dowels is that preferred, it will of course be apparent that we contemplate the use of any number of such parts and any relative arrangements thereof that will permit of the functions described.

While the invention and process is illustrated and described for applying toe calks, it is obvious that it is equally applicable to the securing of heel or special calks, and that the invention can, with equal facility, be applied to the ordinary or any special type of horse shoe.

Having thus described the invention, what we claim as new is:—

The herein described process in initially securing a horse shoe and calk together for welding, consisting in forming the calk with a projection extending beyond the welding surface of the calk, and of a length to project through and beyond the surface of the shoe, and heading the projecting portion thereof to bind the welding surfaces of the shoe and calk in intimate contact prior to the welding operation.

In testimony whereof we affix our signatures in presence of two witnesses.

EDWARD D. CHANINEL.
JOHN R. HENRY.

Witnesses:
  NELLIE TITTLE,
  BERNICE JONES.

---

Copies of this patent may be obtained for five cents each, by addressing the "Commissioner of Patents, Washington, D. C."